United States Patent
Madhavarapu et al.

(10) Patent No.: US 8,774,214 B1
(45) Date of Patent: Jul. 8, 2014

(54) PACKET TRAFFIC SURVEILLANCE AT A NETWORK GATEWAY

(75) Inventors: Gangadharam Madhavarapu, Overland Park, KS (US); Correy S. Trupp, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2221 days.

(21) Appl. No.: 10/456,057

(22) Filed: Jun. 6, 2003

(51) Int. Cl.
*H04J 3/16* (2006.01)

(52) U.S. Cl.
USPC .......................... 370/466; 370/389; 370/230

(58) Field of Classification Search
USPC ....... 370/464–467; 726/22; 379/85; 709/223, 709/224
See application file for complete search history.

(56) References Cited

U.S. PATENT DOCUMENTS

| | | | |
|---|---|---|---|
| 5,796,942 A | | 8/1998 | Esbensen ................. 395/187.01 |
| 6,430,174 B1 * | | 8/2002 | Jennings et al. ............. 370/352 |
| 6,553,025 B1 | | 4/2003 | Kung et al. .................. 370/352 |
| 6,577,865 B2 | | 6/2003 | Dikmen et al. .............. 455/433 |
| 6,785,732 B1 * | | 8/2004 | Bates et al. .................. 709/232 |
| 7,003,316 B1 * | | 2/2006 | Elias et al. ................ 455/556.1 |
| 7,006,508 B2 * | | 2/2006 | Bondy et al. ................. 370/410 |
| 7,055,174 B1 * | | 5/2006 | Cope et al. ..................... 726/22 |
| 7,152,203 B2 * | | 12/2006 | Gao et al. ..................... 715/240 |
| 7,283,521 B1 * | | 10/2007 | Ryan ............................. 370/389 |
| 7,302,702 B2 * | | 11/2007 | Hippelainen .................. 726/13 |

* cited by examiner

*Primary Examiner* — Dady Chery

(57) ABSTRACT

Surveillance of the packet traffic of a user connected to a network such as the Internet pursuant to a duly authorized wiretap. In illustrated embodiments, the user uses wireless technology to access the network. A wiretap request is sent to a central server handling such requests. The central server will typically be associated with a service provider for the user, such as the user's Internet Service Provider (ISP) or wireless service provider. The surveillance request is forwarded to a network element serving the user's mobile device, such as a Mobile Access Gateway (MAG). Underlying content, for example email communications, web page requests and underlying web page content, is forwarded by the MAG to a surveillance server in a manner transparent to the user. The content is also forwarded to the destination. The packet traffic surveillance is preferably performed at a network element, such as the MAG, that also serves the function of translating packets containing the underlying content between one protocol and another, such as for example translating HDTP or WAP packets from the user to HyperText Transfer Protocol (HTTP) packets for transmission between the network element and the content server.

18 Claims, 5 Drawing Sheets

PACKET TRAFFIC SURVEILLANCE AT A NETWORK GATEWAY

BACKGROUND

1. Field of the Invention

This invention relates generally to the field of electronic surveillance techniques, and more particularly, to techniques for surveillance of the web traffic of an individual (hereafter "user"), such as email and web pages accessed by the user, pursuant to a duly authorized wiretap.

2. Description of Related Art

On Oct. 25, 1994, the United States government enacted the Communications Assistance for Law Enforcement Act (CALEA) to make clear a telecommunications carrier's duty to cooperate in the interception of communications for law enforcement purposes. CALEA requires telecommunications service providers (e.g., telephone companies, etc.) to make available both call content (voice signals) and call data (digits dialed, length of call, etc.) to requesting law enforcement agencies in response to a valid court order.

With the growth of the Internet and related technology, voice traffic is now often carried from point to point over a packet-switched communication path rather than over a circuit-switched communication path. In this arrangement, a voice signal may be digitized and encoded and the resulting bit stream then divided into a sequence of payload blocks. A header is added to each payload block, thereby establishing a packet. Each packet is then routed independently to a destination address in the packet header. At the destination address, the packets are then assembled, and the payload is extracted, decoded and converted back into the underlying voice signal.

Some service providers have provided law enforcement with the ability to facilitate wiretapping of packet-based voice traffic. U.S. patent application Ser. No. 09/793,136, currently pending, assigned to the assignee of the present invention, is directed to wiretapping of voice traffic passing over a packet-switched network. The content of the '136 patent application is incorporated by reference herein.

Techniques currently exist for wiretapping voice calls. In a traditional circuit-switched telephone network, for example, a wiretap can be readily implemented by identifying a specific telephone line or channel (e.g., TDM (time divisional multiplexed) time slot, for instance), intercepting the electrical signal carried along that line, and communicating those signals to a surveillance equipment operator. In response to a proper court order, search warrant or wiretap order, a telecommunications service provider may thereby be required to provide law enforcement officials with real-time access to voice calls.

In the wake of the Sep. 11, 2001 terrorist attacks on the United States, the surveillance of individuals suspected of representing a threat to domestic peace and security has been extended to surveillance of the Internet activity of such persons. For example, if an individual under surveillance is seen to be exchanging emails with known or suspected terrorists regarding their funding of activities or potential targets, or if the individual is seen to be accessing web pages describing how to build biological weapons, that information would be of obvious benefits to law enforcement. The information could conceivably prevent a terrorist attack and thus save many innocent lives.

The problem of surveillance of packet traffic on the Internet becomes somewhat more complicated when the user under surveillance is using wireless communication devices, such as a personal digital assistant or cellular phone, in order to access a network such as the Internet. In a wireless situation, the user and their communications device is mobile, such that the attachment point of the user to the Internet can change over time. Moreover, encryption is performed in the transmission path between a mobile access gateway and the user, rendering surveillance of such traffic and in particular access to the underlying content, more difficult.

The present invention overcomes these problems and provides methods and apparatus for providing packet traffic surveillance for web or other network communications of a person under surveillance. The invention is particularly suited for use in providing surveillance of a user that is using wireless technology for exchanging data (email, web page requests, etc.) with a content server on the network.

SUMMARY

This invention relates generally to techniques for surveillance of the network traffic of an individual (hereafter "user") pursuant to a duly authorized wiretap. When a wiretap request is made by a government agency, such as the Federal Bureau of Investigation, the request is sent to a central server handling such requests. The central server will typically be associated with a communications service provider for the user, such as the user's Internet service provider (ISP) or wireless service provider.

The surveillance request is forwarded to a gateway currently serving the user's mobile device, such as a Mobile Access Gateway (MAG). Underlying content, comprising for example, web page requests, email, and/or underlying web page content, is copied and forwarded by the MAG to a surveillance server in a manner transparent to the user, in addition to being forwarded to the destination.

The packet traffic surveillance is preferably performed at a gateway, such as the MAG, that also serves the function of translating packets between one protocol and another. For example, the MAG may include a translation agent translating the web traffic from the Handheld Device Transfer Protocol (HDTP) or a Wireless Application Protocol (WAP), a transport protocol that is used by the user's mobile communications device, to HyperText Transfer Protocol (HTTP), a transport protocol that used by the network content server. Similarly, the MAG also include a software agent translating underlying content from Wireless Markup Language (WML) to Handheld Device Markup Language (HDML) depending on whether the device uses WML or HDML and is connecting to a HDML or WML content server. Performing the packet surveillance at the MAG makes sense because the MAG is the point where the protocol or possibly content translation is taking place. Moreover, in a wireless embodiment, encryption is performed on the underlying content in the communications path between the MAG and the mobile station. Hence, packet surveillance would not be feasible, or at least much more difficult, in network elements in the path between the MAG and the mobile device, such as the Inter-Working Function (IWF) connecting the packet network to the wireless network.

The scenario described above, with packet translations occurring at the MAG, would typically be used with hand-held phone devices that are used for network access. There are some limited situations where the protocol translations would occur in the Inter-Working Function (IWF), for example when a laptop computer uses wireless modem and 3G wireless techniques to connect to a network, hence the invention is not limited to hand-held devices such as telephones and personal digital assistants (PDAs).

As an example of how this invention might be implemented, the central server would receive a wiretap request from the FBI (Federal Bureau of Investigation) for a particular user of a hand-held device such as a wireless PDA or phone. The central server would consult its records and files and determine where in the network the user's mobile device is currently active. A particular MAG currently serving the user would be identified and a wiretap instruction or message would be sent to the MAG. The MAG would then essentially bi-cast the packets that are being transmitted through the MAG between the mobile device and the web content server or email server. In particular, HDTP or WAP packets from the mobile device (e.g., packets containing a request for access to a particular web page), or email would be de-packetized and translated from HDTP or WAP protocol to HTTP protocol. The HTTP packets would then be assembled and be transmitted from the MAG on the Internet to the content server. Simultaneously, content from the web communication, such as the WML or HDML payload from the HDTP or WAP packets comprising a web page request, would also be transmitted to the surveillance server.

For packets in the opposite direction, HTTP/WML or HTTP/HDML packets from the content server would be received in the MAG, depacketized, and translated to the HDTP or WAP protocol, depending on the type of browser supported by the mobile device. The HDTP or WAP packets would then be assembled and then transmitted on to the mobile device. Simultaneously, the content from the web communication (such as a web page or portion thereof, or email) would be transmitted to the surveillance server. The bi-casting of the packets (a) to the endpoint (content server, email server or mobile station) and (b) to the surveillance server, is performed transparently to the user. In other words, the user is unaware of the surveillance.

While the above example has been in the context of web page content, it also would apply to other examples of packet transmission over networks, including email and packetized voice.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Exemplary Architecture

Figure 1:
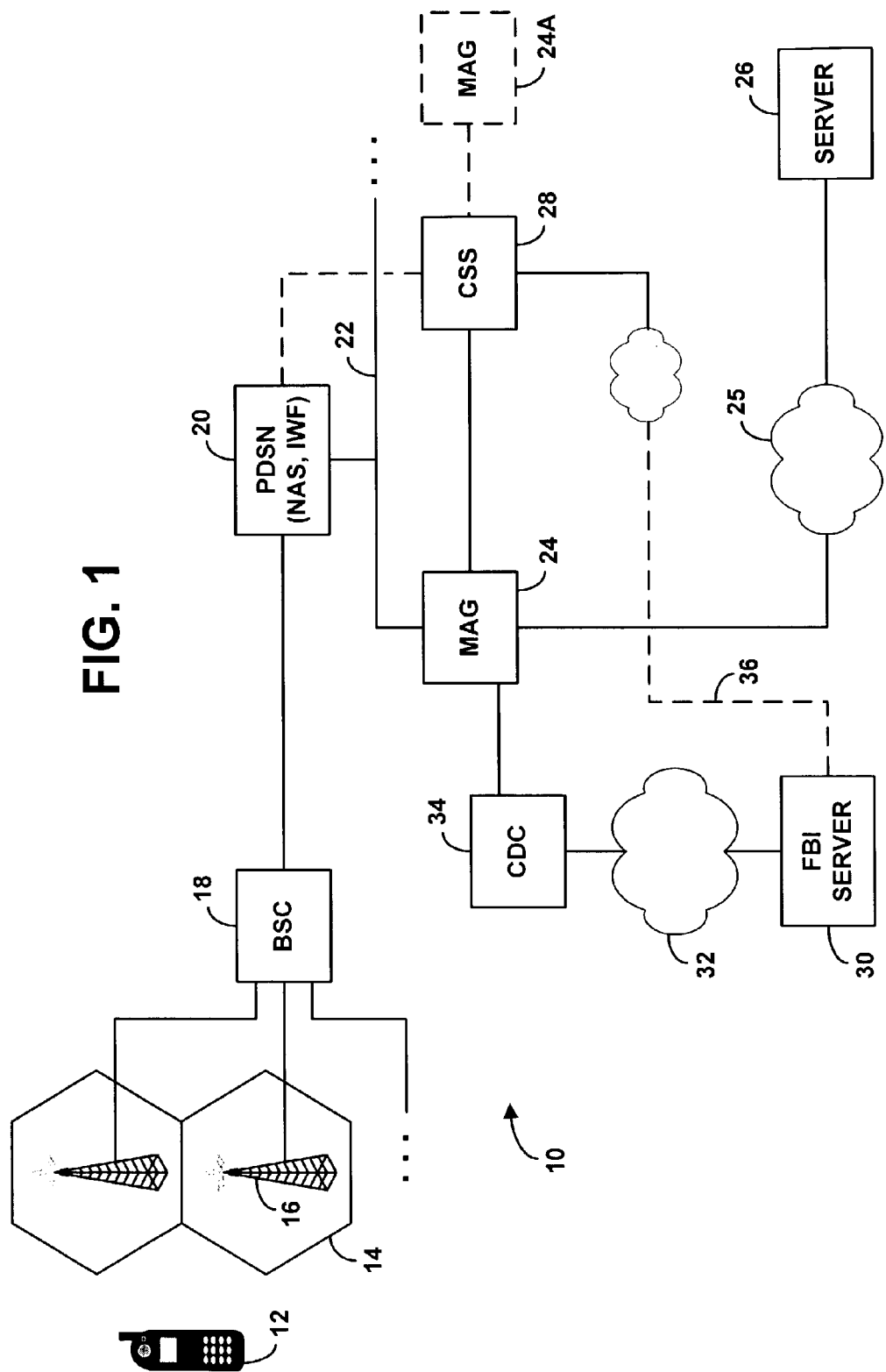
FIG. 1 is a block diagram of a communications network in which the exemplary embodiment can be employed.

Referring now to the drawings, a simplified block diagram of an exemplary communication system 10 is shown in FIG. 1. It should be understood that this and other arrangements described herein are set forth for purposes of example only. Moreover, details that are not pertinent to the invention are eliminated from the present discussion for the sake of clarity and conciseness. As such, those skilled in the art will appreciate that other arrangements and other elements (e.g., machines, interfaces, functions, networking devices or elements, etc.) can be used instead, and some elements can be eliminated altogether. Furthermore, many of the elements described herein are functional entities that may be implemented as discrete or distributed components or in conjunction with other components, and in any suitable location or combination.

Additionally, various functions described herein as being performed by one or more entities may be carried out by hardware, firmware, and/or software logic. For instance, one or more processors executing a set of machine language instructions stored in computer memory may carry out various functions described herein. Provided with the present disclosure, those skilled in the art can readily prepare appropriate instructions to perform such functions.

Figure 1A:
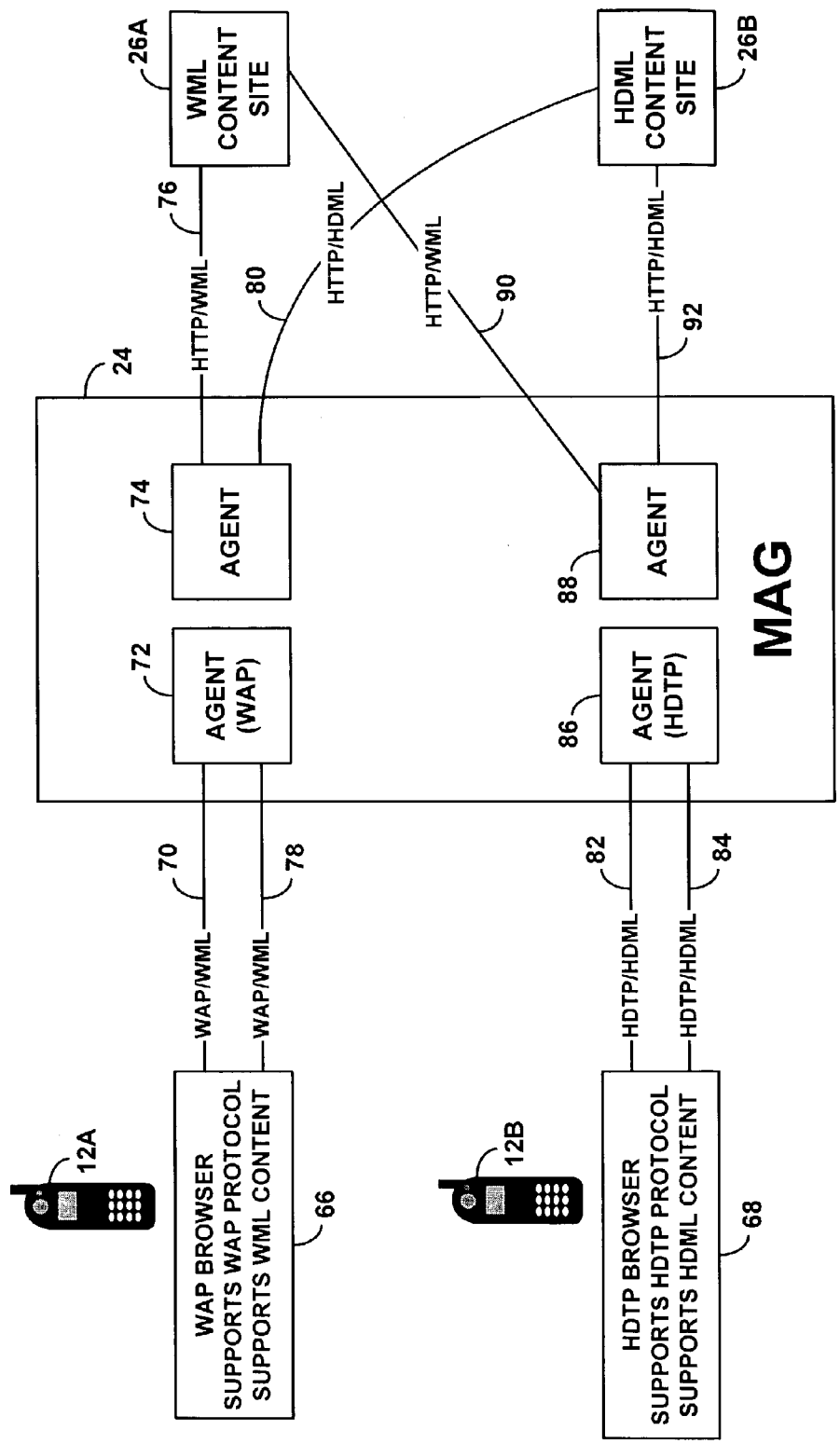
FIG. 1A is a more detailed block diagram of the protocol and content translations that may be performed in the MAG of FIG. 1, depending on the type of browser (WAP or HDTP) supported by the mobile device and the underlying format for web content (HDML or WML).

Referring again to FIG. 1, the communication system 10 includes a wireless communications device 12 that is used by a person that law enforcement agencies may seek to have under surveillance. The communications device 12 could be a cellular telephone, personal digital assistant, laptop computer, or other device which is mobile and has means for communication over an air interface by means of wireless communication techniques. The details of wireless communications techniques are well known in the art. In the example of FIG. 1, the device 12 features Handheld Device Transfer Protocol (HDTP) browser using Handheld Device Markup Language (HDML) for accessing web pages and other Internet related uses. The device uses Handheld Device Transfer Protocol (HDTP) as a transport protocol for transmitting and receiving web communications to the communications network 10 over the air interface. In an alternative configuration as shown in FIG. 1A, the mobile device may include a WAP browser and use WAP as a transport protocol and WML as a format for web content.

The communications system further includes a digital cellular telephone network infrastructure including one or more cells 14. The boundaries of each cell are defined by an RF radiation pattern from a respective base transceiver station (BTS) antenna 16. FIG. 1 depicts each of the cells in an idealized fashion, as a hexagon that does not overlap other cells. In practice, however, most cells may overlap with neighboring cells and will vary widely in shape and size depending on terrain, type and strength of antenna, etc.

In the system 10, the base transceiver stations of each cell site 14 communicate with a base station controller (BSC) 18. In turn, the BSC is coupled with a transport network 22 via a packet data serving node ("PDSN"). Other arrangements are possible as well. In operation, a mobile station 12 positioned within a cell site of the system 10 can then communicate via an air interface with the BTS and, in turn, with an entity on transport network 22 via the BTS antenna 16, BSC 18 and PDSN 20. The PDSN may take the form of a network access server or Inter-Working Function (IWF), the details of which are known in the art.

The transport network 22 is a packet switched network may take the form of a backbone network provided by a wireless service provider, such as AT&T, Verizon, Sprint, etc. A variety of architectures and forms for the network 22 are possible, the details of which are not important. The network 22 includes a Mobile Access Gateway (MAG) 24. The MAG 24 consists of a general-purpose computing platform with an interface to the network 22. The MAG includes software for performing a protocol conversion on web communications 12 that travel over network 22 en route to an endpoint (such as a web content server or email server 26) over intermediate Internet Protocol networks 25. Similarly, the MAG performs a protocol conversion for web traffic from the content server 26 en route to the mobile device 12. Examples of the protocol conversions that may be performed in the MAG are described subsequently in conjunction with FIG. 1A. Additionally, it is possible for the protocol conversions to be performed in other network nodes, such as the PDSN 20 (e.g., in an IWF).

The MAG extracts underlying web communications (such as contents of web page requests, email, etc.) and supplies the web content to a central surveillance server (CSS) 28 in accordance with one aspect of the preferred embodiment. Similarly, the system 10 may include other MAGs, indicated at 24A, which also supply communications from other entities under surveillance to the central surveillance server 28.

The MAG 24 will initiate surveillance activities as described herein upon receipt of a request from a law enforcement agency. In one possible embodiment, a law enforcement agency, such as the FBI, operates a server 30 that issues a wiretap request over a network 32 to a central server administering the wireless carrier's surveillance activities, shown as Clear Data Center (CDC) server 34. The wiretap request may include the phone number or other identifying information of the device or user that the law enforcement wishes to have under surveillance. The CDC server 34 uses this identification or phone number to identify the MAG 24 that is currently handling web communications for the user under surveillance, e.g., by reference to a central table or database.

As noted earlier, underlying web communications between the communications device 12 and the server 26 are supplied to the central surveillance server 28 where they are either stored in memory for later access by law enforcement or transmitted in real time to law enforcement. For example, the FBI server 30 could receive the communications directly from the CSS 28 via the communications path 36 shown in dashed lines. The law enforcement agency is provided with access to the communications. The details on how the law enforcement agency accesses the information from the individual under surveillance are not particularly important.

FIG. 1A shows the type of protocol conversions that may occur in the MAG 24. In FIG. 1A, there are two types of hand-held devices, a device 12 A that has a WAP browser 66 and supports WAP as a transport protocol and WML as a content format or language. The device 12B includes a HDTP browser 68 which supports HDTP as a transport protocol and a HDML as a content format or language.

The wireless devices 12A and 12B seek to communicate via the MAG to different types of content servers or sites, one of which is a WML content server 26A and the other is an HDML content server or site 26B. For communications between the MAG 24 and the content servers 26A and 26B, the communications use HTTP as a transport protocol, and either WML or HDML as the format or language for the underlying content.

When the mobile device 12A sends a web page request to the MAG 24, the WAP/WML packets are received at ports in the MAG that are associated with or assigned to WAP communications. These ports include a software agent 72 that performs a depacketizing and protocol conversion function by which the WAP transport protocol is converted to a HTTP protocol. If the device 12A seeks to access a web page from a WML server (such as the WML content server 26A), there is no need for any translation of the underlying content and the communication is sent in HTTP protocol via an agent 74 to the WML content server 26A, indicated by the path 76. However, if the wireless device 12A seeks to access a HDML content site, then agent 74 will provide a translation or conversion function to convert WML content to HDML and sends HTTP/HDML packets to the HDML content server 26B, as indicated by path 80.

The wireless device 12B sends HDTP/HDML packets on path 82 to ports in the MAG that are associated with HDTP communications. The path 82 indicates a path for communications that are to be responded to by a WML server. The HDTP ports include a HDTP software agent 86 that converts HDTP to HTTP. If the communication is destined for a WML content server 26A, the communications are processed by an agent 88 that converts HDML to WML and forwards the HTTP/WML packets to the WML content server 26 as indicated by path 90. If the communication from the wireless device is to a HDML site (indicated by path 84), the communications are received by the HDTP ports in the MAG and the agent 86 converts the HDTP to HTTP. The communications are then sent by agent 88 directly to the HDML content server 26B without any conversion of language or content since both the wireless device 12 B and the HDML content site 26B use the same language for content.

The process shown in FIG. 1A and described above works in the reverse process for communications from the servers 26A and 26B to the wireless devices 12A and 12B.

It will also be appreciated that FIG. 1A does not show the bi-casting of underlying content to a central surveillance server 28 of FIG. 1, but it will be understood that such functions are also performed in the MAG of FIG. 1A. For example, the agents 74 and 88, or other software processes in the MAG, send underlying content from the mobile devices 12A and 12B and the servers 26A and 26B to the central surveillance server 28 of FIG. 1.

Figure 2:
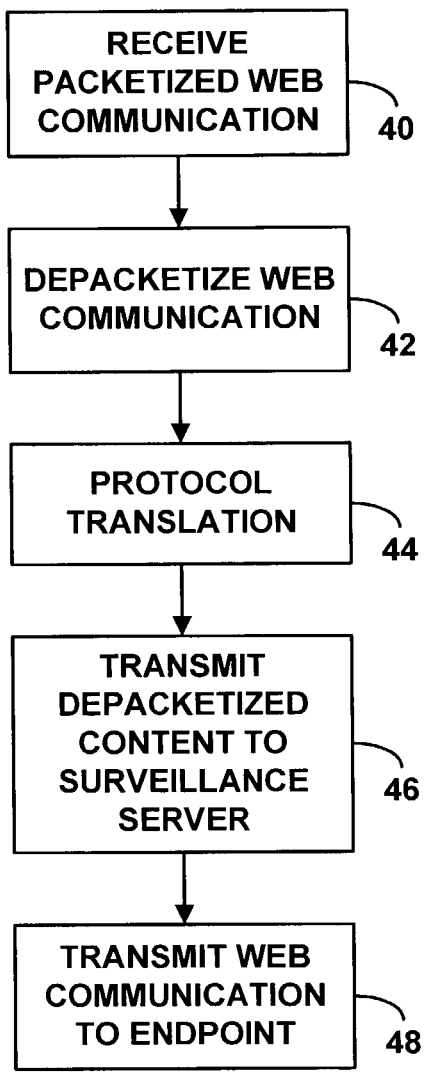
FIG. 2 is a flow chart of functions that can be performed in software in the Mobile Access Gateway (MAG) of FIG. 1.
Figure 5:
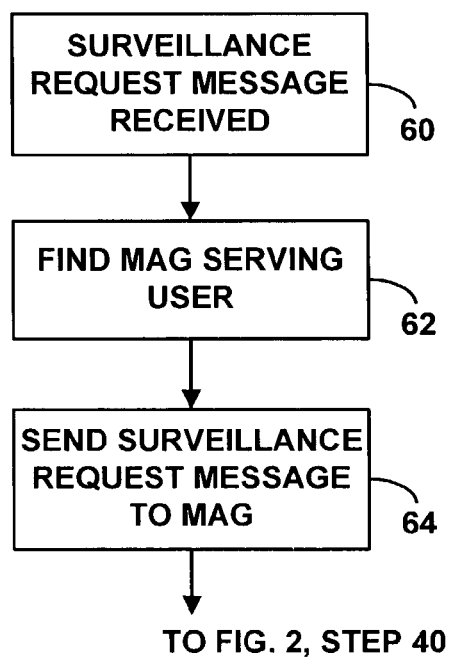
FIG. 5 is a flow chart of software processes that may be executed at a centralized data center which processes surveillance requests from a law enforcement agency.

With the above description in mind, and with reference to FIGS. 1, 2 and 5, a first embodiment of a method of surveillance of the packet traffic for a user will be further described. When a wiretap request is made by a government agency, such as the Federal Bureau of Investigation, the request is sent from the FBI server 30 to the CDC server 34 that handles such requests on behalf of the wireless service provider. See step 60, FIG. 5. The central server 34 will typically be associated with a service provider for the user's device 12, such as the user's Internet service provider (ISP) or wireless service provider. The central server 34 then identifies the MAG 24 currently serving the user under surveillance, such as by reference to a table (step 62, FIG. 5).

The surveillance request is forwarded to the MAG 24 or gateway currently serving the user's mobile device. See step 64, FIG. 5. The process of FIG. 2 then executes in the MAG 24. Thus, in response, the MAG receives underlying web content in the form of packet data sent over the network 22, such as for example email, web page requests and underlying web page content. The packets are depacketized and content is forwarded by the MAG 24 to the CSS 28 surveillance server in a manner transparent to the user. In addition, a protocol conversion takes place and the packet data is reassembled in the new protocol and then forwarded to the content server 26. A similar process takes place for traffic from the content server that is destined for the mobile communications device 12.

The packet traffic surveillance is preferably performed at a network node, such as the MAG 24, that also serves the function of translating packets containing the underlying web content between one communications protocol and another. For example, the MAG may be translating the web traffic from HDTP or WAP transport protocol, the format used by the mobile device, and a HTTP transport protocol, which is used by the content server 26. Similarly, content may be translated from WML to HDML or vice versa depending on whether the mobile device uses WML or HDML and seeks to communicate with a content server that uses the other format for content. Performing the packet surveillance at the MAG 24 makes sense because the MAG 24 is the node in the network 22 where this protocol translation is taking place. Moreover, in a wireless embodiment, encryption is performed on the underlying content in the communications path between the MAG 24 and the communications device 12. Hence, packet surveillance would not be feasible, or at least much more difficult, in network elements in the path between the MAG and the mobile device, such as the PSDN 20 connecting the packet network 22 to the wireless network.

Thus, with reference to FIGS. 1 and 2, a method is described herein of providing surveillance using a gateway or node 24. The method is preferably executed as a series of functions coded in software in the gateway 24. These steps or functions include:

a) A step 40 of receiving a packetized web communication from a first endpoint 12 in a network element (e.g., MAG 24), such as for example receiving an HDTP or WAP communication from a mobile device 12 comprising a web page request;

b) A step 42 of depacketizing the web communication in the MAG 24;

c) A step 44 of translating the web communication from a first web communication protocol (e.g., HDTP or WAP) to a second communication protocol (e.g., HTTP) in the MAG 24. The nature of type of protocol conversion is not particularly important and HDTP or WAP to HTTP is only one possible example of protocol conversion.

d) A step 46 of transmitting content from the web communication to a surveillance server (e.g., CSS 28) and e) A step 48 of transmitting the web communication in the second communication protocol (HTTP) to a second endpoint (content server 26) on behalf of the first endpoint (wireless communication device 12).

The interception of transmissions also can occur for transmissions from the content server 26 to the wireless device 12. Thus, the flow chart of FIG. 2 works for communications in both directions.

The scenario described above, with packet translations occurring at the MAG 24, would typically be used with second generation ("2G") hand-held phones and like devices that are used for network access. There are some limited situations where the protocol translations would occur in the PDSN (IWF 20), for example when a laptop computer uses a wireless modem and 3G wireless techniques to connect to a network. Hence, the invention is not limited to hand-held devices such as telephones and personal digital assistants (PDAs).

As an example of how this invention might be implemented, the central CDC server 34 would receive a wiretap request from the FBI for a particular user of a hand-held device such as a wireless PDA or phone. The CDC server 34 would consult its records and files and determine where in the network the user's mobile device is currently active. A particular MAG 24 currently serving the user would be identified and a wiretap instruction or message would be sent to the MAG. The MAG does the protocol conversion between the protocol used by the content server (HTTP) and the protocol used by the wireless device (e.g., HDTP or WAP). The MAG then transmits the packets that are being transmitted through the MAG between the mobile station and the web content server or email server to their respective destination, while simultaneously transmits underlying content from the web communications to the surveillance server 28. In particular, HDTP or WAP packets from the mobile station (e.g., packets containing a request for access to a particular web page, or email) are de-packetized and translated from HDTP or WAP protocol to HTTP protocol. The HTTP packets would then be assembled (re-packetized) and transmitted from the MAG 24 over the Internet to the content server 26. Simultaneously, content from the web communication, such the WML or HDML payload comprising a web page request, would also be transmitted to the surveillance server.

For packets in the opposite direction, HTTP/WML or HTTP/HDML packets from the content server are received in the MAG, depacketized, and translated to the HDTP or WAP protocol. The HDTP or WAP packets would then be re-assembled and then transmitted on to the mobile device 12. Simultaneously, the content from the web communication (such as a web page or portion thereof, or email) would be transmitted to the surveillance server 28. The bi-casting of the packets (a) to the endpoint (content server, email server or mobile station) and (b) to the surveillance server, is performed transparently to the user. In other words, the user is unaware of the surveillance.

Figure 3:
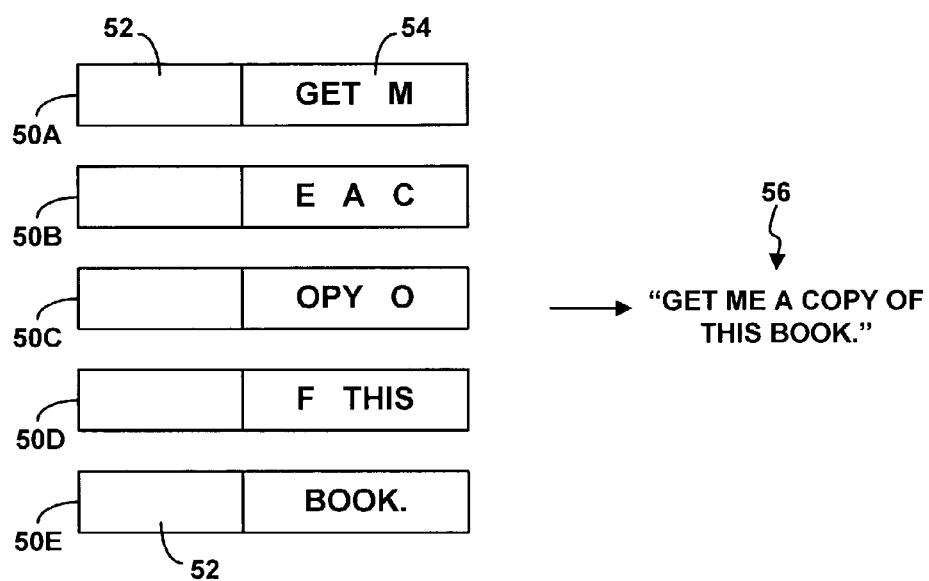
FIG. 3 is a diagram of the extraction of underlying content from a packet containing web communications.

FIG. 3 is a drawing showing on example of a web communication from a wireless device. The communications includes a plurality of packets 50A-50E, each consisting of a header field 52, the details of which are not important, and a payload field 54 containing substantive communications from the user operating the mobile device 12. The content of the payload field is essentially unimportant, and could take a variety of forms, including requests to access particular web pages, email messages, etc. In the example of FIG. 3, the series of packets 50A-50E consists of a series of packets, each of which include a portion of a text message. These packets are encrypted and transmitted over the network 22 to the MAG 24 in accordance with the HDTP protocol in the present example. The MAG 24 depacketizes packets 50A-50E to extract the underlying web communication content 56: "get me a copy of this book." The MAG 24 furnishes the content 56 in real time to the central surveillance server 28 of FIG. 1. The MAG also performs the protocol conversion to converts the packet data to HTTP packets, reassembles the packets and sends the reassembled packets over the network 22 (and intervening networks 25) to the content server 26.

Figure 4:
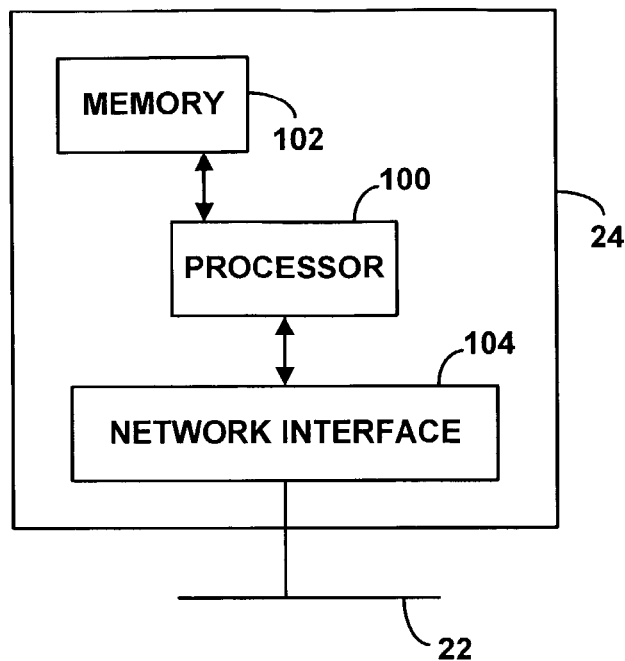
FIG. 4 is a block diagram of the MAG of FIG. 1.

The structure of the MAG 24 is not particularly important, and other functions the device may perform in various possible embodiments are omitted herein for the sake of brevity. In essence, and with reference to FIG. 4, the MAG 24 may take the form of a general purpose computer and include a processor 100, memory 102 storing machine language instructions for execution by the processor 100, and appropriate network interfaces 104, protocol stacks, and software and hardware to allow the MAG 24 to receive communications from the network 22 and send web content over the network to the surveillance server. The instructions stored in memory 102 includes the software for performing the functions of FIGS. 1A and 2 as described in detail herein. These instructions include the WAP and HDTP agents for conversion between WAP and HDTP protocols and HTTP protocol, and agents for conversion between WML and HDML content, as shown in FIG. 1A.

Thus, from the preceding discussion, in one possible embodiment of the invention, a network element provides packet surveillance for packets exchanged between a mobile device 12 associated with a user and a content server 26 on a computer network. The network element includes a computing platform comprising a processor 100 and a memory 102 storing instructions for execution by the processor, the instructions including instructions:

a) processing a surveillance request message for packet traffic associated with the mobile device;
b) receiving and depacketizing a network communication (e.g., web page, email, etc) from the content server 26 bound for the mobile device 12;
c) translating the network communications from a first communications protocol associated with the content server 26 to a second communications protocol associated with the mobile device 12;
d) re-packetizing the network communication in accordance with the second communication protocol;
e) forwarding the network communication re-packetized in accordance with instructions d) to further communications elements (e.g., routers, bridges, PSDN, etc.) for delivery to the mobile device 12, and
f) forwarding de-packetized content (e.g., 56, FIG. 3) from the network communication to a surveillance server 28.

In one possible embodiment, the network element implementing instructions a)-f) is a mobile access gateway, but this functionality could be implemented in other network devices where the packet translation is performed, such as in the PSDN or IWF.

In another possible embodiment, a network element is provided which employs packet surveillance for packets exchanged over a computer network between a content server 26 and a communications device 12 associated with a user under surveillance. The element includes a computing platform comprising a processor and a memory storing instructions for execution by the processor. These instructions include instructions processing a surveillance request message for packet traffic associated with the communications device 12, instructions receiving and depacketizing a network communication from the communications device 12; instructions translating the network communication from a first communications protocol associated with the communications device (e.g., HDTP or WAP) to a second communications protocol (HTTP) associated with the content server; instructions re-packetizing the network communication in accordance with the second communication protocol; instructions forwarding the network communication re-packetized in the WAP protocol for delivery to the content server, and instructions forwarding underlying content from the network communication from the mobile device 12 to a surveillance server.

Various modifications and variations are possible without departure from the scope of the invention. The nature of the protocol translation, the identity of the protocols used, and other facets of the illustrated embodiment are made herein by way of illustration and not limitation. This true scope of the invention will be ascertained by reference to the appended claims.

We claim:

1. A method of surveillance of web packet traffic for a user, the method comprising the steps of:
   receiving from a first endpoint a web communication packetized according to a first web communication protocol;
   depacketizing the received web communication;
   repacketizing the depacketized web communication in accordance with a second web communication protocol, wherein the second web communication protocol is different from the first web communication protocol;
   transmitting content from the depacketized web communication to a surveillance server; and
   transmitting the repacketized web communication to a second endpoint on behalf of the first endpoint while transmitting content from the depacketized web communication to the surveillance server, wherein the second endpoint comprises a web content server, and wherein the web communication comprises a web page request.

2. The method of claim 1, wherein the receiving, depacketizing, repacketizing, transmitting content, and transmitting the repacketized web communication steps are performed by a network element.

3. The method of claim 2, wherein the first web communication protocol comprises one of a Handheld Device Transfer Protocol (HDTP) and a Wireless Application Protocol (WAP) protocol, and wherein the second web communication protocol comprises a HyperText Transfer Protocol (HTTP).

4. The method of claim 2, wherein the network element comprises a mobile access gateway.

5. The method of claim 2, wherein the network element comprises an Inter-Working Function (IWF).

6. The method of claim 2, wherein the content is depacketized from a payload portion of the received web communication.

7. A network element providing packet surveillance for packets exchanged between a mobile device associated with a user and a web content server, the network element comprising:
   a computing platform comprising a processor and a memory storing instructions for execution by the processor, the instructions including instructions for:
   a) processing a surveillance request message for packet traffic associated with the mobile device;
   b) receiving a network communication packetized according to a first communication protocol from the content server and bound for the mobile device;
   c) depacketizing the received network communication;
   d) repacketizing the depacketized network communication in accordance with a second communication protocol associated with the mobile device, wherein the second communication protocol is different from the first communication protocol;
   e) forwarding the repacketized network communication to a communication element for delivery to the mobile device, and
   f) forwarding content from the depacketized network communication to a surveillance server, wherein the content is depacketized from a payload portion of the received network communication.

8. The network element of claim 7, wherein the mobile device comprises a cellular telephone.

9. The network element of claim 7, wherein the first communication protocol comprises one of a Handheld Device Transfer Protocol (HDTP) and a Wireless Application Protocol (WAP) protocol, and wherein the second communication protocol comprises a HyperText Transfer Protocol (HTTP).

10. The network element of claim 7, wherein the network element comprises a mobile access gateway.

11. The network element of claim 7, wherein the network element comprises an Inter-Working Function (IWF).

12. The network element of claim 7, wherein forwarding content from the depacketized network communication to the surveillance server comprises forwarding content from the depacketized network communication to the surveillance server while forwarding the repacketized network communication to the communication element for delivery to the mobile device.

13. A network element providing packet surveillance for packets exchanged over a computer network between a web content server and a mobile device associated with a user under surveillance, the network element comprising:

a computing platform comprising a processor and a memory storing instructions for execution by the processor, the instructions including instructions for:
  a) processing a surveillance request message for packet traffic associated with the mobile device;
  b) receiving a network communication packetized according to a first communication protocol and sent from the mobile device;
  c) depacketizing the received network communication;
  d) repacketizing the depacketized network communication in accordance with a second communication protocol associated with the content server, wherein the second communication protocol is different from the first communication protocol;
  e) forwarding the repacketized network communication to the content server, and
  f) forwarding content from the depacketized network communication to a surveillance server, wherein the content is depacketized from a payload portion of the received network communication.

14. The network element claim 13, wherein the mobile device comprises a cellular telephone.

15. The network element of claim 14, wherein the first communication protocol comprises an HDTP protocol, and wherein the second communication protocol comprises a HyperText Transfer Protocol (HTTP).

16. The network element of claim 13, wherein the network element comprises an Inter-Working Function (IWF).

17. The network element of claim 13, wherein the network element comprises a mobile access gateway.

18. The network element of claim 13, wherein forwarding content from the depacketized network communication to the surveillance server comprises forwarding content from the depacketized network communication to the surveillance server while forwarding the repacketized network communication to the content server.

* * * * *